3,726,741
METHOD OF BONDING EMPLOYING RADIAL BLOCK COPOLYMER ADHESIVE COMPOSITIONS
Terence C. Middlebrook, Bartlesville, Okla., assignor to Phillips Petroleum Company
No Drawing. Filed Oct. 7, 1970, Ser. No. 78,982
Int. Cl. B44c; A43d 9/00
U.S. Cl. 156—334
4 Claims

ABSTRACT OF THE DISCLOSURE

Radial or branched block copolymers of butadiene and styrene are employed as adhesive compositions in a solvent in the absence of a tackifying agent to bond radial block copolymer compounds containing naphthenic-type extender oils.

---

This invention pertains to adhesive compositions.

In one of its more specific aspects, this invention pertains to the use of radial block copolymers in adhesive compositions.

Radial block copolymers are well known and their preparation has been disclosed in U.S. Pat. 3,281,383 issued to Zelinski et al., Oct. 25, 1966. The branched or radial rubbery block polymers of that invention can be depicted as $(A-B)_xY$ type polymers wherein A represents non-elastomeric polymer blocks, or segments, and B represents elastomeric polymer segments. Y is an atom or group of atoms derived from a polyfunctional treating agent used in the formation of the radial polymers, and $x$ is an integer of at least 3, and $x$ can be equal to the number of functional groups of the polyfunctional treating agent.

According to the present invention there is provided a process for bonding radial block copolymer compositions containing naphthenic-type extender oils which comprises employing as the bonding agent a radial block copolymer of butadiene and styrene, the agent being employed in solution form in the substantial absence of a tackifying agent, the composition consisting of, as its essential ingredients, the radial block copolymer and a solvent therefor. Naphthenic-type extender oils may be further identified as Type 103 under the ASTM classification system ASTM D2226–63T.

The method of this invention is advantageously applied in bonding slab shoe sole compounds, the shoe sole compound being comprised of the same radial block copolymer and a naphthenic-type extender oil.

The radial block copolymer composition of this invention is employed in solution form, the cementitious properties being imparted by employing it in a composition which includes a material, usually a hydrocarbon, in which it is soluble and which can be removed from the bonding surfaces after the solution has been applied thereto. Preferably, hydrocarbons such as benzene, toluene, xylene, and naphthas or mixtures thereof, are employed, the composition containing from about 10 to about 50 weight percent of the polymer.

The advantage of the present adhesive lies in the fact that because it can be employed for the bonding of radial block copolymers which contain oil, such copolymers can now have oil included in their compositions where previously the inclusion of oil in such quantities when the composition was to be adhesively bonded, was prohibited. Since such oils are now includable in such block copolymer compositions, they now can be produced with less cost and, in addition, possess greater flexibility.

While the compositions of the adhesives concerned herein can vary appreciably, they will advantageously include minor amounts of certain other components such as antioxidants, pigments, and the like.

The method of this invention is illustrated in the following example in which an adhesive containing a radial block copolymer but no tackifying agent was compounded as follows:

|  | Wt. percent |
|---|---|
| Radial block copolymer | 20 |
| Solvent (toluene) | 80 |

The radial block copolymer was produced by first polymerizing styrene (40 parts by weight) with sec-butyllithium in a hydrocarbon diluent. 1,3-butadiene (60 parts by weight) was next added and polymerized. This mixture was then terminated with an epoxidized linseed oil and the polymer recovered and dried.

This material was employed as an adhesive in a comparison test with a commercially employed adhesive, under identical conditions in bonding strips of radial block copolymer compounds of various naphthenic extended oil contents to strips of a standard commercial shoe sole compound. The radial block copolymer compounds were typical shoe sole compounds except for the high levels of oil employed. In all aspects, the two adhesives were employed in bonding identical materials under identical conditions. The force required to destroy the bonding effect of the two adhesives was as follows:

| | Pull, pounds/inch | |
|---|---|---|
| Adhesive | Commercial | Invention |
| No oil in radial block copolymer compound | 24 | 26 |
| 20% oil in radial block copolymer compound | 21 | 42 |
| 30% oil in radial block copolymer compound | 17 | 41 |
| 60% oil in radial block copolymer compound | 11 | 35 |

The data indicate that while the adhesive of this invention was about equivalent to the commercial adhesive when bonding a radial block copolymer in which there was no extender oil, as the amount of extender oil in the stock was increased, the bonding property of the commercial adhesive continuously decreased. To the contrary, the bonding property of the adhesive of this invention improved to a value greater than that possessed by the stock containing no extender oil.

It will be evident from the foregoing that various modifications can be made to this invention. Such, however, are considered within the scope of the invention.

What is claimed is:

1. In the process for bonding radial copolymer compositions containing at least about 20 percent napthenic-type extender oils, the improvement comprising employing a bonding agent consisting essentially of a radial block polymer of butadiene and styrene and a solvent for said polymer.

2. The method of claim 1 in which said solvent is a hydrocarbon selected from the group consisting of benzene, toluene, xylene, and naphthas and said bonding agent contains said copolymer in an amount within the range of from about 10 to about 50 weight percent of said agent.

3. The method of claim 1 in which said bonding agent consists of about 20 weight percent of said copolymer and about 80 weight percent of toluene.

4. The method of claim 1 in which said radial copolymer composition containing said naphthenic-type extender oil is employed as a shoe sole.

References Cited

UNITED STATES PATENTS

| | | | |
|---|---|---|---|
| 2,601,318 | 6/1952 | Navikas | 156—334 |
| 2,701,780 | 2/1955 | Nelson et al. | 156—334 |
| 2,715,953 | 8/1956 | Cottle et al. | 156—334 |
| 3,281,383 | 10/1966 | Zelinski | 260—23.7 |

OTHER REFERENCES

Skeist Handbook of Adhesives, Reinhold Pub. Co., New York, p. 12 (1962).

JOHN D. WELSH, Primary Examiner

U.S. Cl. X.R.

12—142 F, 146; 36—30; 161—253